7618X
S. D. Breed.
Leather Hose.
Patented June 29, 1833.
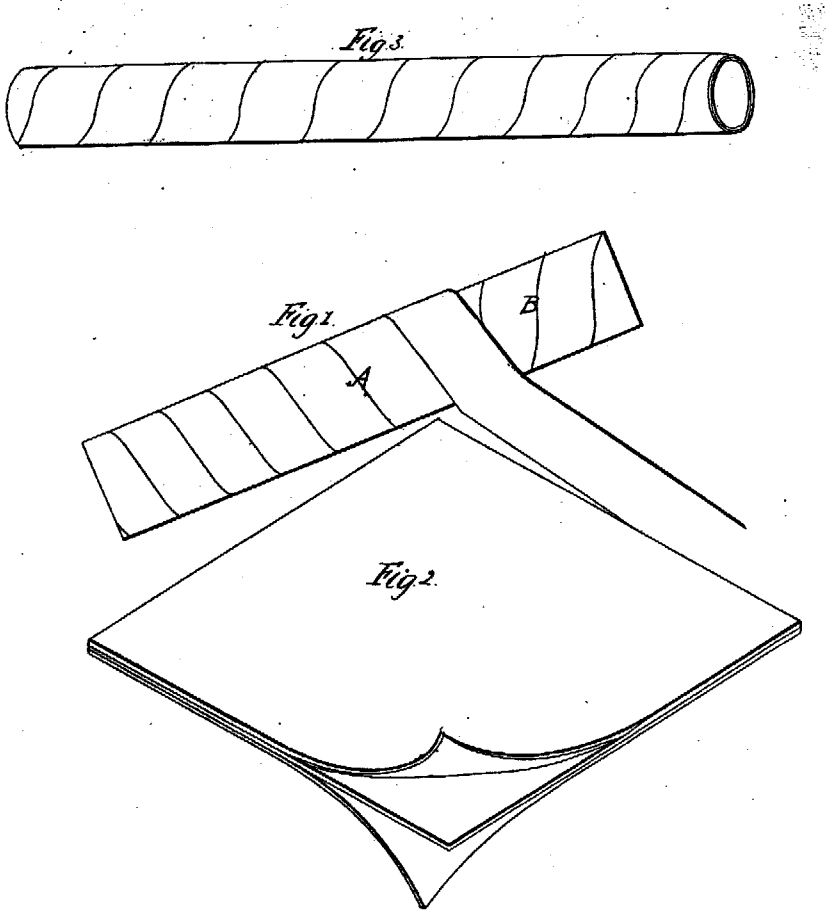

Samuel D. Breed Philadelphia P a.

Letters Patent.

The Schedule referred to in these Letters Patent, and making part of the same, containing a description in the words of the said Samuel D. Breed, himself of his improvement in Manufacturing from Cloth, the Hose used for Fire Engines. —

To all whom it may concern:

Be it known that I, Samuel D. Breed of the City of Philadelphia have invented a new & useful mode or method of manufacturing from Cloth the Hose used for Fire Engines & for the conveyance of water or other fluids, for various purposes; and also of so preparing the same material by a similar process, as to serve as a foundation for Machine & other Cards to be set with wire teeth; both of which articles have usually been made of leather.... And I do hereby declare that the following is a full & exact description of my said invention.

The Cloth employed for either of the above purposes, is to consist of two or more thicknesses, saturated with & cemented together by a solution of caoutchouc, sometimes called gum elastic or india rubber.

I dissolve the caoutchouc in rectified spirits of turpentine, naptha, oil of sassafras or any of the other menstrua in which that substance is soluble; to which solution, I sometimes add resinous substances, or drying oils, should I deem such addition to be necessary always depending however upon the properties possessed by the Caoutchouc & allowing it to form the main body of the solution or varnish.... When hose is to be made

4

I cut the cloth into strips & wind it spirally round a cylinder of metal, wood or any other suitable material, of the proper size, saturating it either before or after it is wound, with the prepared solution, or varnish. I cut the cloth of such a width as to allow it to lap over in winding one or two inches, or any other desired distance taking care in every successive winding so to lap as to break joints with the former.—

Any number of thicknesses of cloth necessary to give the strength required may be thus used.— For this no rule can be given, as it will depend not only on the use to which the hose is to be put, but also upon the strength of the material itself.

After this first saturation, the varnish is allowed to dry, when another coating thereof may be given, and the hose be afterward removed from the cylinder. When I prepare the cloth to serve as a substitute for leather in forming the foundation of cards, I in like manner saturate it with the before mentioned varnish cementing as many thicknesses together as the foundation requires.

The cloth is then subjected to heavy pressure until it is dry or nearly so. When perfectly dried the teeth are to be set in the usual way.— I do not claim to be the inventor of the above named varnish, or of the application of it to render cloth water proof, but what I do claim as my invention, is the manufacturing of hose & of a foundation for cards, of cloth cemented together in two or more thicknesses, in the manner hereinbefore set forth & thus employing it as a substitute for leather in the formation of these articles.—

Samuel D. Breed

Witnesses
John Binns
Wm. Maddock